United States Patent [19]

Weynachter et al.

[11] Patent Number: 4,780,786

[45] Date of Patent: Oct. 25, 1988

[54] SOLID-STATE TRIP UNIT OF AN ELECTRICAL CIRCUIT BREAKER WITH CONTACT WEAR INDICATOR

[75] Inventors: Luc Weynachter; Vincent Corcoles, both of Grenoble, France

[73] Assignee: Merlin Gerin, Grenoble, France

[21] Appl. No.: 77,420

[22] Filed: Jul. 24, 1987

[30] Foreign Application Priority Data

Aug. 8, 1986 [FR] France ................................ 8611612

[51] Int. Cl.⁴ ................................................ H02H 6/00

[52] U.S. Cl. ........................................ 361/87; 361/96; 361/97; 324/424; 340/638

[58] Field of Search ....................... 361/78, 86, 87, 89, 361/91, 93–96, 97; 340/638, 644, 639; 324/424, 420, 418; 364/482, 484, 494

[56] References Cited

U.S. PATENT DOCUMENTS

| | | | |
|---|---|---|---|
| 4,527,214 | 7/1985 | Hattori et al. | 361/94 X |
| 4,550,360 | 10/1985 | Dougherty | 361/93 |
| 4,620,156 | 10/1986 | Alvin et al. | 324/424 |
| 4,670,812 | 6/1987 | Doerfler et al. | 361/94 X |

FOREIGN PATENT DOCUMENTS

| | | |
|---|---|---|
| 0147592 | 12/1984 | European Pat. Off. . |
| 0195693 | 9/1986 | European Pat. Off. . |
| 2727378 | 1/1979 | Fed. Rep. of Germany . |

*Primary Examiner*—A. D. Pellinen
*Assistant Examiner*—Todd E. DeBoer
*Attorney, Agent, or Firm*—Parkhurst, Oliff & Berridge

[57] ABSTRACT

A digital solid-state trip unit of an electrical circuit breaker is equipped with an electrical contact wear indicator enabling the degree of wear of these contacts to be known. Each time the circuit breaker performs a break, the microprocessor determines a contact wear value, in terms of the maximum value of the current broken. The correspondence between the wear value and the current broken is stored in a ROM memory and the successive wear values are added in a NOVRAM memory whose contents are representative of the degree of contact wear. These contents can be displayed to indicate to the user that the condition of the contacts has to be checked.

7 Claims, 3 Drawing Sheets

SOLID-STATE TRIP UNIT OF AN ELECTRICAL CIRCUIT BREAKER WITH CONTACT WEAR INDICATOR

BACKGROUND OF THE INVENTION

The invention relates to a digital solid-state trip unit for an electrical circuit breaker with separable contacts.

Satisfactory operation of an electrical circuit breaker depends on the state of wear of the contacts, a poor contact causing overheating by Joule effect and destruction of the circuit breaker. Circuit breakers often comprise an insulated housing, notably a moulded case, which gives them great reliability, but this housing hampers users used to performing visual checks of the state of the circuit breaker contacts. Such checking is frequent in open type, low voltage circuit breakers with high ratings, which are arranged for disassembly and replacement of the worn contacts. It is important to detect contact wear in time to avoid the whole switchgear device being destroyed and this check must be easy and avoid, in particular, having to disassemble the parts.

Circuit breakers are often equipped with a counter indicating the number of operations and thereby the degree of mechanical wear of the device, but this indication is insufficient to know the wear of the contacts, an opening on a short-circuit gives rise to greater erosion of the contacts than that caused by a simple breaking of the rated current.

It has furthermore been proposed to check the state of a switchgear device by taking account of the current broken.

In a state-of-the-art device, a mechanical contact associated with the contacts of the switchgear device sends a read signal of a memory whose data input is connected to a current measuring device and whose output supplies a wear value associated with the current measured at the time of reading. The wear values read in the memory are added so as to supply a value representative of the degree of contact wear. If this type of device is used in conjunction with a circuit breaker, there can be a non-negligible time lag between the moment a tripping order is sent to the circuit breaker and the moment the contacts open, and it is obvious that the current value measured at the time of reading the memory does not correspond to the peak current value.

A device is moreover known wherein a microprocessor computes a value representative of the degree of contact wear from the current value i during breaking and from the number of breaks n forming the integral $\int i.n.dt$, and causing tripping of the circuit breaker when this value is greater than a preset threshold.

SUMMARY OF THE INVENTION

The object of the present invention is to achieve indication of the degree of contact wear of a circuit breaker without disassembling the latter, taking account of the maximum current value during the break.

The trip unit according to the invention comprises:

a detection circuit generating an analog signal proportional to the current flowing in the conductor protected by the circuit breaker, an analog-to-digital converter having an input receiving said analog signal and an output delivering a corresponding sampled digitized signal, a microprocessor-based digital processing unit, to which the digitized signal is applied to perform a long delay tripping function and/or a short delay tripping function and which generates a circuit breaker tripping order, when preset thresholds are exceeded, said order being time delayed according to the value of the signal, the digital processing unit comprising a detector of the maximum value of the current broken each time the circuit breaker performs a break, a device generating, at each break, a wear value in terms of said maximum current value and representative of the contact wear, due to breaking of said current, a device for summing and storing said wear values in a memory and a display means of the wear value stored in said memory providing an indicator of the degree of wear of said contacts, and circuit breaker tripping means actuated by said tripping order.

In the case of a solid-state trip unit, it is advantageous that the trip unit take the peak value of the current broken at each break. Wear indication is then particularly simple. Indeed, the microprocessor can, by comparison with a wear curve entered in a memory, establish the corresponding wear value of the contacts. These wear values merely have to be added together in order to know the general condition of the contacts, this condition being displayed permanently or preferably on request, and possibly remotely. An alarm or self-protection device by tripping of the circuit breaker can operate when the degree of wear exceeds a preset threshold, overstepping of this threshold being advantageously detected by the microprocessor itself. The wear indication is not an absolutely accurate measurement, other factors than the peak current broken, such as the quality of the contact material, the contact separation speed or the arc displacement speed, having an influence on contact wear. The accuracy nevertheless proves sufficient to be able to set an acceptable threshold below which the contacts can in no case be worn. When this threshold is reached, a check, for example a visual inspection, is called for and the user can decide whether to replace the worn contacts or to keep the circuit breaker in service if the contacts are only partially worn, by increasing the threshold by a value depending on the condition of the contacts. The appreciation of the threshold value requires a certain experience and of course necessitates more careful subsequent supervision.

The wear indicator according to the invention has the advantage of using the digital solid-state trip unit components, the microprocessor capacity being sufficient to process this additional function. The wear curve, which naturally depends on the circuit breaker type, can easily be entered in the memory when the trip unit is customized, notably when the other values and operating thresholds of the trip unit are set. The wear curve is a function of the maximum current broken, and microprocessor processing is notably simplified by admitting a discrete variation, this approximation being perfectly compatible with the required accuracy.

In a preferred embodiment, the wear curve is a stepped curve, which enables all the singular phenomena to be taken into account and makes the curve easy to modify.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
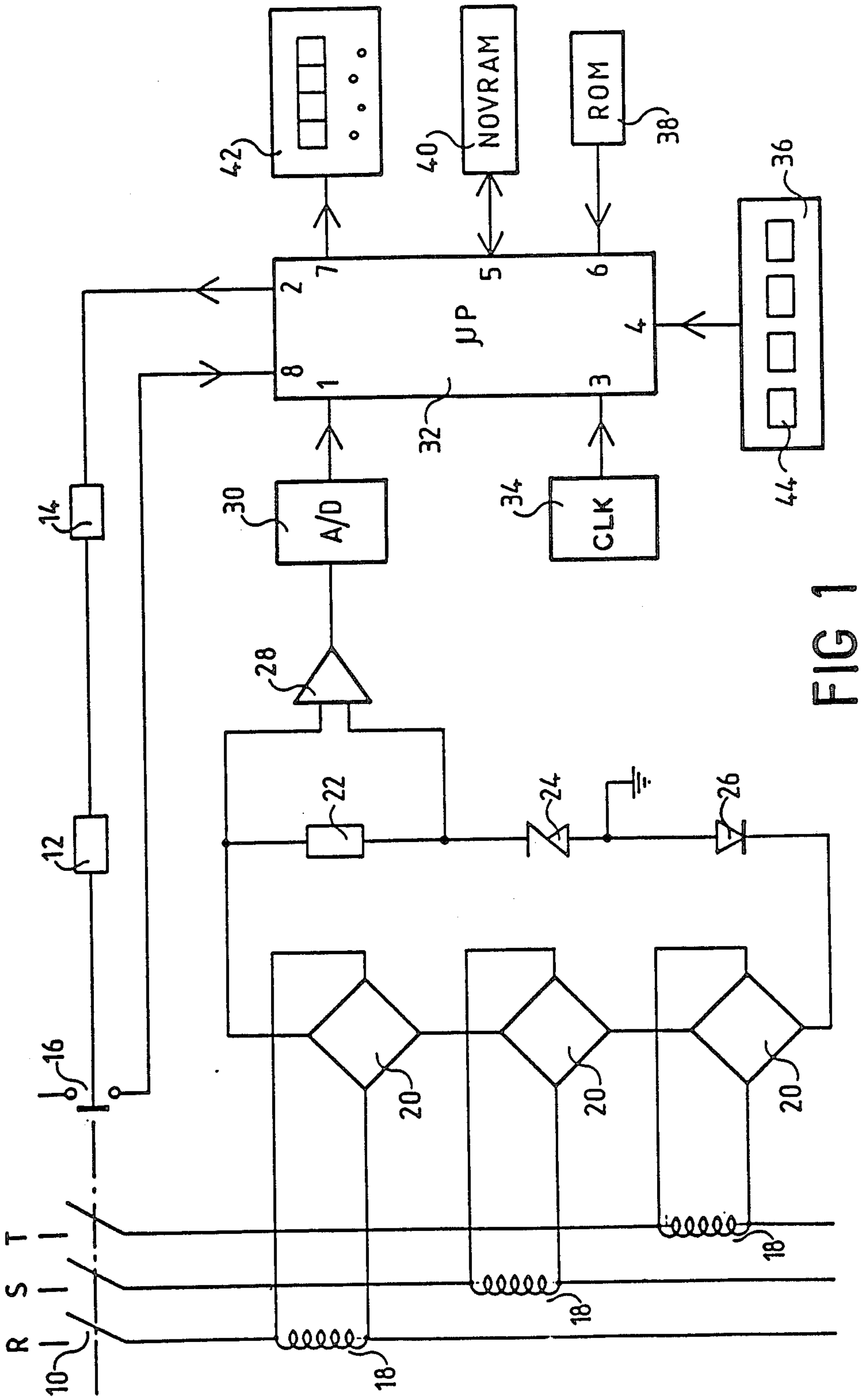
FIG. 1 is a block diagram of the trip unit according to the invention.

In FIG. 1, an electrical distribution system with 3 conductors R, S, T, supplying a load (not represented) comprises a circuit breaker 10 capable of breaking the circuit in the open position. The mechanism 12 of the circuit breaker 10 is controlled by a polarized relay 14 causing tripping of the circuit breaker if an overload or short-circuit occurs. An auxiliary contact 16, operating in conjunction with the main contacts of the circuit breaker 10 indicates the position of these main contacts. Each conductor R, S, T, has associated with it a current transformer 18 which delivers a signal proportional to the current flowing in the associated conductor, the signal being applied to a full-wave rectifier bridge 20. The outputs of the 3 rectifier bridges 20 are connected in series in a circuit comprising a resistor 22, a Zener diode 24 and a diode 26 to provide at the terminals of the resistor 22 a voltage signal proportional to the maximum value of the current flowing in the conductors R, S, T, and at the terminals of the diode 24, a voltage supply to the electronic circuits. The voltage signal is applied to the input of an amplifier 28, whose output is connected to an analog-to-digital converter 30. The output of the analog-to-digital converter 30 is connected to an input/output 1 of a microprocessor 32. The microprocessor 32 comprises in addition an output 2 connected to the polarized relay 14, an input 3 receiving the signals from a clock 34, an input 34 connected to a keyboard 36, an input 6 connected to a ROM memory 38, an input/output 5 connected to a non-volatile NOVRAM memory 40, an output 7 connected to a display means 42 and an input 8 connected to the auxiliary contact 16.

The trip unit according to FIG. 1 performs the protection function, notably long delay tripping and/or short delay tripping respectively when an overload and a fault occur in the conductor R, S, T circuit. It is pointless giving a detailed description of this protection function which is set out in U.S. patent application Ser. No. 827,438, now U.S. Pat. No. 4,710,848 claiming priority of the French patent application No. 8,503,159 filed on Feb. 25th 1985. The digital signal representative of the maximum value of the current in the conductors R, S, T is applied to input 1 of the microprocessor 32 and compared with threshold values stored in a memory to detect if these thresholds are exceeded and to generate a delayed or instantaneous tripping order, which is transmitted to the relay 14 to bring about breaking of the circuit breaker 10. The trip unit may of course perform other functions, notably earth protection or instantaneous tripping.

The invention can be used in any type of microprocessor-based solid-state trip unit and is in no way limited to the trip unit of the type described hereinafter. As an non-limiting example, the current detection means may comprise current sensors supplying analog signals representative of the current derivative di/dt and whose output is connected to integrating circuits, the integrating circuit output signals being transmitted to the microprocessor via an analog-to-digital converter.

Figure 2:
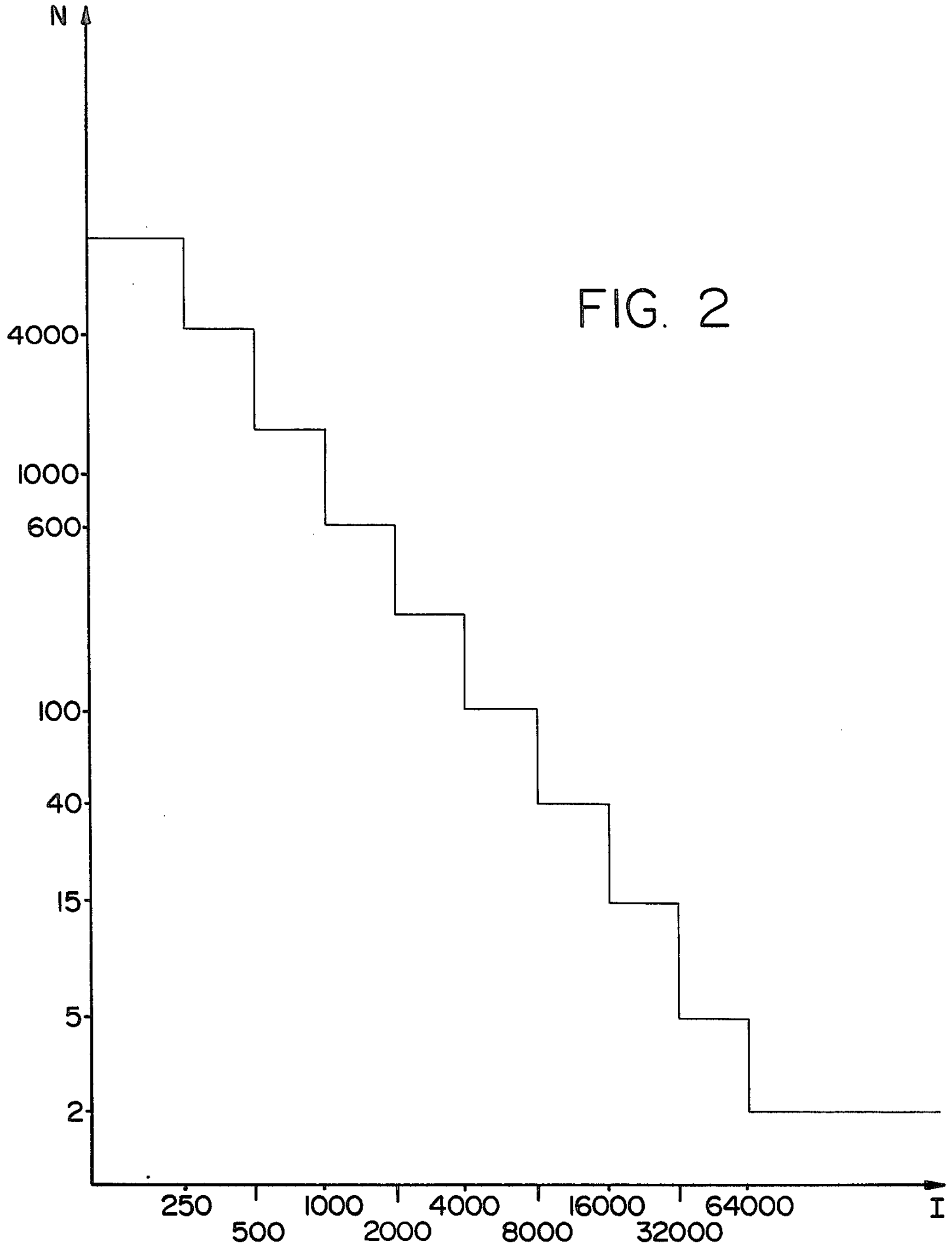
FIG. 2 represents the variation curve of the number of operations possible N in terms of the intensity of the current broken I.

According to the present invention, the trip unit performs a maintenance function by generating and displaying a value representative of the degree of contact wear. Calculations and tests have shown that each time the circuit breaker breaks, the contact wear, the wear being greater the higher the maximum current value broken. As an example, a curve has been represented in FIG. 2 indicating the number N of circuit breaker breaks possible in terms of the maximum current value broken. This curve is naturally valid for a certain type of circuit breaker and it can be seen that after two current breaks of more than 64,000 amps, the contacts are totally worn out. If, on the other hand, the currents broken are notably lower, for example between 250 and 500 amps, contact wear will only occur after 4,000 breaking operations. Taking the logarithmic scale of FIG. 2 into account, it can be seen that the curve perceptibly represents an exponential function corresponding to the relation $N \times I^{K2} = K1$, K1 and K2 being constants characteristic of the circuit breaker type. This curve is of course a continuous function, but the stepped representation according to FIG. 2 facilitates processing by microprocessor. Microprocessor processing is further facilitated if the current value of a given plateau corresponds to twice the current value of the plateau immediately below, as in the curve represented in FIG. 2. Using a stepped curve, drawn up experimentally, moreover enables all the singular phenomena which may occur for certain current values to be taken into account easily. It is thus very easy to modify the correspondence table at a given point if necessary and to adapt the curve to the different types of switchgear. To each circuit breaker break there corresponds a certain contact wear which depends on the maximum value of the current broken. This wear, for example represented by the value 100/N, is added together each time the circuit breaker breaks and the total contact wear is reached, in this case when the wear value reaches the number 100. In order to know the condition of the contacts, the maximum value of the current broken merely has to be measured each time a circuit breaker break occurs and the corresponding contact wear determined by means of the function represented in FIG. 2. The microprocessor determines what is the maximum value reached by the current by comparing the successive current values which are applied to it between the time it generates the tripping order and the time the circuit supervised by the circuit breaker is effectively broken. By simply adding these wear values together, the degree of wear reached due to the operations performed can be known at any time. The microprocessor 32 of the digital solid-state trip unit described hereabove is particularly suited to performing this function, microprocessor capacities being generally speaking superabundant in solid-state trip units of this kind. In addition, the maximum value reached by the current when breaking occurs is preferably displayed so as to provide the user with an indication of the peak value reached when a trip occurs. The correspondence between the maximum current values broken I and the wear value 100/N is incorporated in the ROM memory 38 connected to the input 6 of the microprocessor 32. In the case where the successive current plateau values are in a ratio of 2, the correspondence table can be simplified, only the successive wear values having to be stored in the ROM memory 38. The successive wear values are added together and stored in the NOVRAM memory 40 and this stored value can be displayed on the display means 42 when a maintenance button 44 belonging to the keyboard 36 is actuated.

Figure 3:
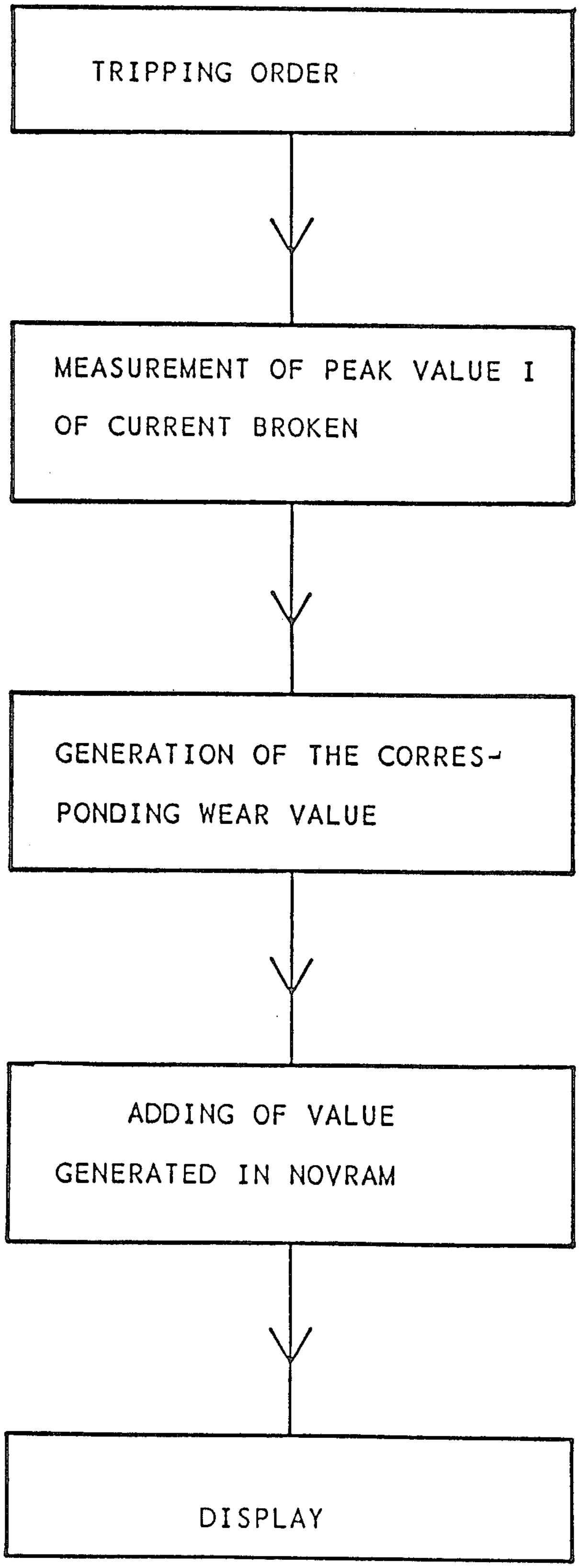
FIG. 3 is the maintenance function flowchart.

The flowchart represented in FIG. 3 illustrates the maintenance function according to the invention. In the case of automatic tripping of the circuit breaker, the tripping order produced by the microprocessor triggers a sub-routine consisting in measuring the maximum current broken value I from the values supplied by the angle-to-digital converter 30 on input 1 of the microprocessor 32. If the circuit breaker is broken by manual opening or by actuating a handle or a toggle, the auxiliary contact 16 closes and sends a signal to the input 8 of the microprocessor 32. This circuit breaker breaking signal also triggers the maximum current value broken measurement sub-routine. Naturally, the auxiliary contact 16 also sends a signal to the input 8 when tripping is ordered automatically by the microprocessor. In this case however, this signal is not taken into account by the microprocessor which began measuring the maximum value of the current broken as soon as the tripping order was sent. In practice, the maximum duration of the break is known, from the sending of the tripping order by the microprocessor, and the maximum current value broken measurement sub-routine takes account of all the current values supplied to the microprocessor during a predetermined time corresponding to this maximum duration from the sending of the tripping order in the case of automatic breaking or from receipt by the microprocessor of a signal in its input 8 in the case of a manual break.

The microprocessor 32 acquires the wear value corresponding to this maximum value I from the ROM memory 38 and adds this wear value to the contents of the NOVRAM memory 40. This program runs each time the circuit breaker 10 breaks and the corresponding wear values are added in the NOVRAM memory 40. The contents of the NOVRAM memory 40 are displayed by pressing a button 44 on the keyboard 36 which triggers a cycle requesting the contents of the NOVRAM memory 40 and displaying these contents on the display means 42. The display may of course be permanent, but such a display is of little interest, checking only being performed periodically notably after trips and high short-circuit current breaks. So long as the wear value displayed remains below a given threshold which, in the example set out above, would be the value 100, the user is assured of satisfactory operation of the circuit breaker, the contacts not being completely worn. As soon as this threshold is reached, the condition of the contacts has to be checked, this check being performed by the user himself or by a maintenance specialist who, by visual examination of the contacts or by any other means, can obtain confirmation of contact wear or possibly ascertain that the degree of wear reached does not yet affect satisfactory operation of the circuit breaker. This inaccuracy stems from the external conditions affecting contact wear which are difficult to calculate by means of the microprocessor. A more thorough study of contact wear factors can reduce this inaccuracy but to the detriment of device simplicity. The main interest of the wear indicator according to the invention is to release the user from all supervision constraints and uncertainty for a relatively long period. At the end of this period, a check has to be made and if the user decides to replace the contacts, he then disposes of another period of the same duration before another check has to be made. The display means 42 can naturally have associated with or incorporated in it an alarm device indicating that the preset wear threshold has been reached to inform the user that a check has to be made. The alarm signal can also cause the circuit breaker 10 to break with a possible indication of the cause of this breaking.

The correspondence values between the currents broken and the contact wear naturally depend on the type of circuit breaker and these different values can be stored in different ROM memories 38, the appropriate memory being appreciated with the trip unit when the latter is fitted on the corresponding circuit breaker. It is also possible to enter these values when the microprocessor 32 is programmed. Manual operation of the circuit breaker 10 to break the rated current causes reduced contact wear and in a simplified installation this wear does not have to be taken into account. The auxiliary contact 16 can then be omitted, the microprocessor 32 having available the circuit breaker 10 tripping information which it itself transmitted to the polarized relay 14. The relation between the contact wear value and current broken can also be translated by a mathematical relation supplied to the microprocessor 32, which is then able to compute the wear value directly. It is clear that it would not depart from the scope of the invention if the maximum value of the current broken was supplied directly to the microprocessor 32 by any suitable means or if the circuit generating the signal representative of the value of the current flowing in the conductors R, S, T was of a different type. It is also possible to process the fault trip functions and the maintenance function by different microprocessors if the processing capacity of a single microprocessor proves insufficient.

We claim:

1. A digital solid-state trip unit including an electrical circuit breaker with separable contacts, comprising:
- detection circuit means for generating an analog signal proportional to current flowing in a conductor protected by the circuit breaker;
- analog-to-digital convertor means, connected to said detection circuit means, for converting said analog signal into a sampled digitized signal;
- digital processing means connected to said analog-to-digital convertor means and generating a tripping order after at least one of a long time delay and short time delay when said sampled digitized signal exceeds respective predetermined thresholds, said tripping order being time delayed as a function of a magnitude of said sampled digitized signal;
- means, responsive to said tripping order, for opening said separable contact;
- said digital processing means comprising:
  - means for detecting a maximum value of current broken each time said separable contacts open by comparison between the successive values of said digitized signals which are applied to said processing means between the time the circuit breaker tripping order is generated and effective opening of the contacts occur;
  - means for generating, upon each opening of said separable contacts, a wear value representative of wear of said separable contacts as a function of a respective said maximum value of current;
  - means for calculating a sum of a succession of said wear values generated from a succession of said contact openings;
  - means for storing said sum in a memory; and means for displaying said sum to provide an indication of a degree of wear of said contacts.

2. The solid-state trip unit according to claim 1, wherein said means for generating includes means for storing a stepped curve representative of a relationship between maximum current and wear value.

3. The solid-state trip unit according to claim 1, wherein said means for storing said sum comprise a non-volatile NOVRAM memory which is incremented by a corresponding wear value each time the contacts of the circuit breaker is opened.

4. The solid-state trip unit according to claim 3, further comprising:

means for manually opening the separable contacts of the circuit breaker;

means for detecting manual opening of the separable contacts of the circuit breaker; and means for calculating a wear value upon detection of manual opening of the separable contacts.

5. The solid-state trip unit as recited in claim 3, further comprising means for demanding display of said sum stored in said NOVRAM memory.

6. The solid-state trip unit as recited in claim 1, further comprising means for generating an indication when said sum exceeds a predetermined threshold.

7. The solid-state trip unit according to claim 6, further comprising means for generating a tripping order responsive to said indication.

* * * * *